(12) United States Patent
Shibasaki

(10) Patent No.: US 7,433,369 B2
(45) Date of Patent: Oct. 7, 2008

(54) CONTROLLING NETWORK TRAFFIC

(75) Inventor: Kazunori Shibasaki, Kodama-gun (JP)

(73) Assignee: Juniper Networks, Inc., Sunnyvale, CA (US)

( * ) Notice: Subject to any disclaimer, the term of this patent is extended or adjusted under 35 U.S.C. 154(b) by 69 days.

(21) Appl. No.: 11/686,590

(22) Filed: Mar. 15, 2007

(65) Prior Publication Data

US 2007/0211634 A1 Sep. 13, 2007

Related U.S. Application Data

(63) Continuation of application No. 10/098,124, filed on Mar. 15, 2002, now Pat. No. 7,212,493.

(30) Foreign Application Priority Data

Mar. 15, 2001 (JP) ............................... 2001-74306

(51) Int. Cl.
*H04J 3/16* (2006.01)
*H04J 3/22* (2006.01)

(52) U.S. Cl. .................. 370/468; 370/229; 370/230; 370/232; 370/233; 370/234; 370/235; 370/236; 370/237; 370/465; 370/395.21; 709/201; 709/221; 709/222; 709/225; 709/226; 709/229; 709/238

(58) Field of Classification Search ............. None
See application file for complete search history.

(56) References Cited

U.S. PATENT DOCUMENTS 5,315,586 A * 5/1994 Charvillat ................ 370/232
5,649,107 A * 7/1997 Kim et al. ................ 709/224
5,745,694 A * 4/1998 Egawa et al. ............. 709/225
5,812,526 A 9/1998 Chang et al.
6,097,722 A 8/2000 Graham et al.
6,633,566 B1 10/2003 Pierson, Jr.
6,907,003 B1 * 6/2005 Gvozdanovic ............ 370/232
2002/0156914 A1* 10/2002 Lo et al. .................... 709/238

FOREIGN PATENT DOCUMENTS

| EP | 0 658 999 | 6/1995 |
| EP | 0658999 | 6/1995 |
| JP | H06-69921 | 3/1994 |
| JP | H09-214548 | 8/1997 |
| JP | 10-41956 | 2/1998 |
| JP | H11-136238 | 5/1999 |

OTHER PUBLICATIONS

Patent Abstracts of Japan, vol. 1998, No. 6, Apr. 30, 1998.

* cited by examiner

*Primary Examiner*—Raj K Jain
(74) *Attorney, Agent, or Firm*—Harrity Snyder, LLP

(57) ABSTRACT

In an ATM exchange, a cell transmission control section transmits an ATM cell to a transmission path of an ATM network. A traffic monitor monitors traffic of the cell transmissions. A statistical process section performs a temporal statistical process on the result of the traffic monitoring using a clock and a memory. A CAC produces an instruction for traffic control over a transmission terminal based on the result of the statistical process. A UPC controls traffic of a transmission path from the transmission terminal in accordance with the instruction.

20 Claims, 7 Drawing Sheets

CONTROLLING NETWORK TRAFFIC

RELATED APPLICATION

This application is a continuation of U.S. patent application Ser. No. 10/098,124 filed Mar. 15, 2002, which claims priority under 35 U.S.C. 119 based on Japanese Patent Application No. 2001-074306 filed Mar. 15, 2001, both of which are incorporated by reference herein.

BACKGROUND OF THE INVENTION

This invention broadly relates to a method of controlling traffic between ATM (Asynchronous Transfer Mode) exchanges in an ATM network having a plurality of terminals connected via the ATM exchanges, and in particular, to a method of effectively utilizing transmission paths of the ATM network.

In case where a transmission terminal communicates with another terminal via an ATM network connected to ATM exchanges, amount of transmission (traffic) is controlled between the transmission terminal and the ATM exchange. In general, the transmission terminal subscribes traffic bands to be used, and the ATM exchange controls so that the transmission terminal uses a transmission path within the transmission bands. The traffic bands are fixed to the bands at the time of subscription.

Under such circumstances, the ATM exchange includes a CAC (Connection Admission Controller) and a UPC (Usage Parameter Controller). With this structure, the CAC judges whether or not a band is held within the subscription bands of the transmission path connected to the UPC as well as whether or not the ATM exchange can be connected to the ATM network (in other words, whether it is a usable band or not). Therefore, the availability of the band depends on a traffic state of the ATM network at that time.

SUMMARY OF THE INVENTION

It is therefore an object of this invention to provide a method of controlling traffic of an ATM exchange which is capable of effectively utilizing a transmission path.

It is another object of this invention to provide a method of controlling traffic of an ATM exchange which is capable of distributing traffic loads of an ATM network.

Other objects of this invention will become clear as the description proceeds.

According to a first aspect of this invention, there is provided an ATM exchange having a terminal comprising a cell transmission control section which transmits an ATM cell to a transmission path of an ATM network; a traffic monitor which monitors traffic of the ATM cell transmitted by the cell transmission control section; a statistical process section which performs a temporal statistical process on a result of the traffic monitoring; a clock and a memory which perform the temporal statistical process; a connection admission controller which recognizes a maximum value of a subscription traffic band of the connected terminal and which judges traffic bands usable by the terminal based on the result of the statistical process to issue a command; and a usage parameter controller which controls the traffic bands allocated to the terminal in time sequence based on the command issued from the connection admission controller.

According to a second aspect of this invention, in the ATM exchange according to the first aspect, a plurality of the terminals are connected to the ATM exchange, the usage parameter controller is connected to each of the connected terminals, the traffic monitor monitors cell transmission bands of each of the terminals via the cell transmission control section, the statistical process section performs the temporal statistical process for the result and reports the result to the connection admission controller, and the connection admission controller determines the traffic bands usable by each of the terminals and issues the command to each of the usage parameter controllers.

According to a third aspect of this invention, there is provided an ATM network in which a plurality of the ATM exchanges according to the first aspect are connected to each other, one of the ATM exchanges serves as a main ATM exchange, each of the other ATM exchanges has means for reporting the traffic result of the statistical process of the terminal connected thereto to the main ATM exchange; and the main ATM exchange determines the traffic bands usable in time sequence in accordance with the reported traffic results of the statistical process at every ATM exchanges and reports the results to the other ATM exchanges.

According to a fourth aspect of this invention, there is provided an ATM network including the ATM exchanges according to the first aspect and terminals connected to thereto, the ATM exchanges have means for transmitting traffic bands in time sequence allocated to the terminal connected thereto to the terminal, and the terminal has means for displaying the allocated traffic bands in time sequence.

According to a fifth aspect of this invention, there is provided a method of controlling traffic in an ATM exchange having a terminal, the method comprising the steps of monitoring traffic of a ATM cell transmitted to a transmission path of an ATM network; performing a temporal statistical process on a result of the traffic monitoring; judging traffic bands usable by the terminal based on the result of the statistical process and a maximum value of a subscription traffic band of the connected terminal; and controlling the traffic bands to be allocated to the terminal in time sequence.

According to a sixth aspect of this invention, there is provided a method of controlling traffic in an ATM network in which a plurality of ATM exchanges are connected to each other, the method comprising the steps of serving one ATM exchange as a main ATM exchange; reporting a result of a statistical process on traffic of terminals connected thereto from the other ATM exchange to the main ATM exchange; and determining traffic bands usable in time sequence for each ATM exchange based on the reported result of the statistical process on traffic by the main ATM exchange so as to report the result to the other ATM exchanges.

In accordance with this invention, traffic bands can be effectively utilized without allocating unnecessary bands to the ATM network because the traffic bands can be controlled in time sequence in the ATM network.

Further, a terminal user can recognize usable bands and time allocated to the user. Consequently, a transmission path can be used when use of the ATM network is permitted.

Moreover, it is possible to control traffic bands of terminals connected to respective ATM exchanges via the ATM network so as to distribute the load of the traffic.

DESCRIPTION OF PREFERRED EMBODIMENTS

Figure 1:
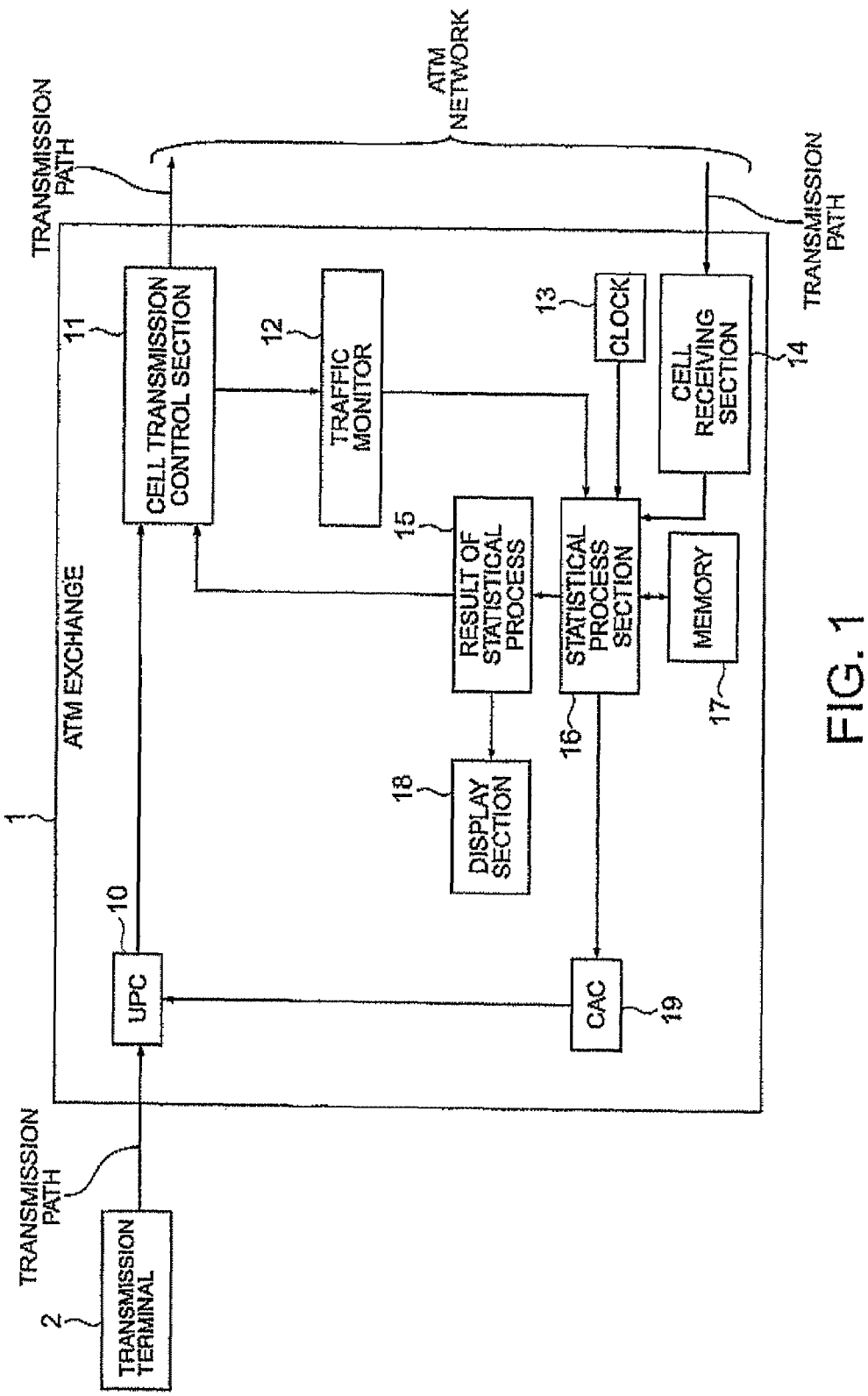
FIG. 1 is a configuration diagram of an ATM exchange according a first embodiment of the invention.

Referring now to FIG. 1, description will be made about a first embodiment of this invention.

Generally, a CAC (Connection Admission Controller) in an ATM exchange controls admission of connection between an ATM exchange and a terminal connected thereto, and judges whether a band can be used or not when a transmission terminal is going to use the band to issue a command specifying whether the use of the band is permitted or not. A UPC (Usage Parameter Controller) actually controls the band of the terminal on the basis of the command from the CAC.

An ATM exchange 1 includes a cell transmission control section 11 for transmitting ATM cells to a transmission path of an ATM network, a traffic monitor 12 for monitoring traffic of cell transmissions from the cell transmission control section 11, and a statistical process section 16 for performing a temporal statistical process on the result of the traffic monitoring. Further, the ATM exchange comprises a clock 13 and a memory 17 for temporally performing a statistical process, a statistical processing result section 15 for reporting a result of the statistical process, and a display section 18 for displaying the result. In addition, it has a cell receiving section 14 for receiving cells from the ATM network.

According to the first embodiment of this invention, a CAC 19 produces an instruction for controlling traffic of a transmission terminal 2 based on the result of the statistical process at the statistical process section 16. A UPC 10 controls traffic of a transmission path given from the transmission terminal 2 in response to the instruction from the CAC 19.

It is assumed here that the CAC 19 of the ATM exchange 1 recognizes a maximum band value of subscription traffic bands of the transmission terminal 2 as the first condition. The statistical process section 16 performs a temporal statistical process upon traffic bands within the maximum traffic band. The traffic monitor 12 monitors quantity of cells transmitted from the cell transmission control section 11 and reports the result to the statistical process section 16. In the statistical process section 16, the quantity of cells and time information from the traffic monitor 12 is stored in the memory 17 in time sequence.

For example, such data are stored for 24 hours and are then totalized at the statistical process section 16, and the result is reported to the CAC 19 and the statistical process result section 15.

The CAC 19 controls the traffic bands of the transmission terminal 2 in time sequence via the UPC 10. In the meantime, the statistic process result section 15 transmits the statistical result to the display section 18 and transmits statistic result information to the terminal of interest via the cell transmission control section 11. The display section 18 displays how the traffic bands are controlled in time sequence.

Figure 2:
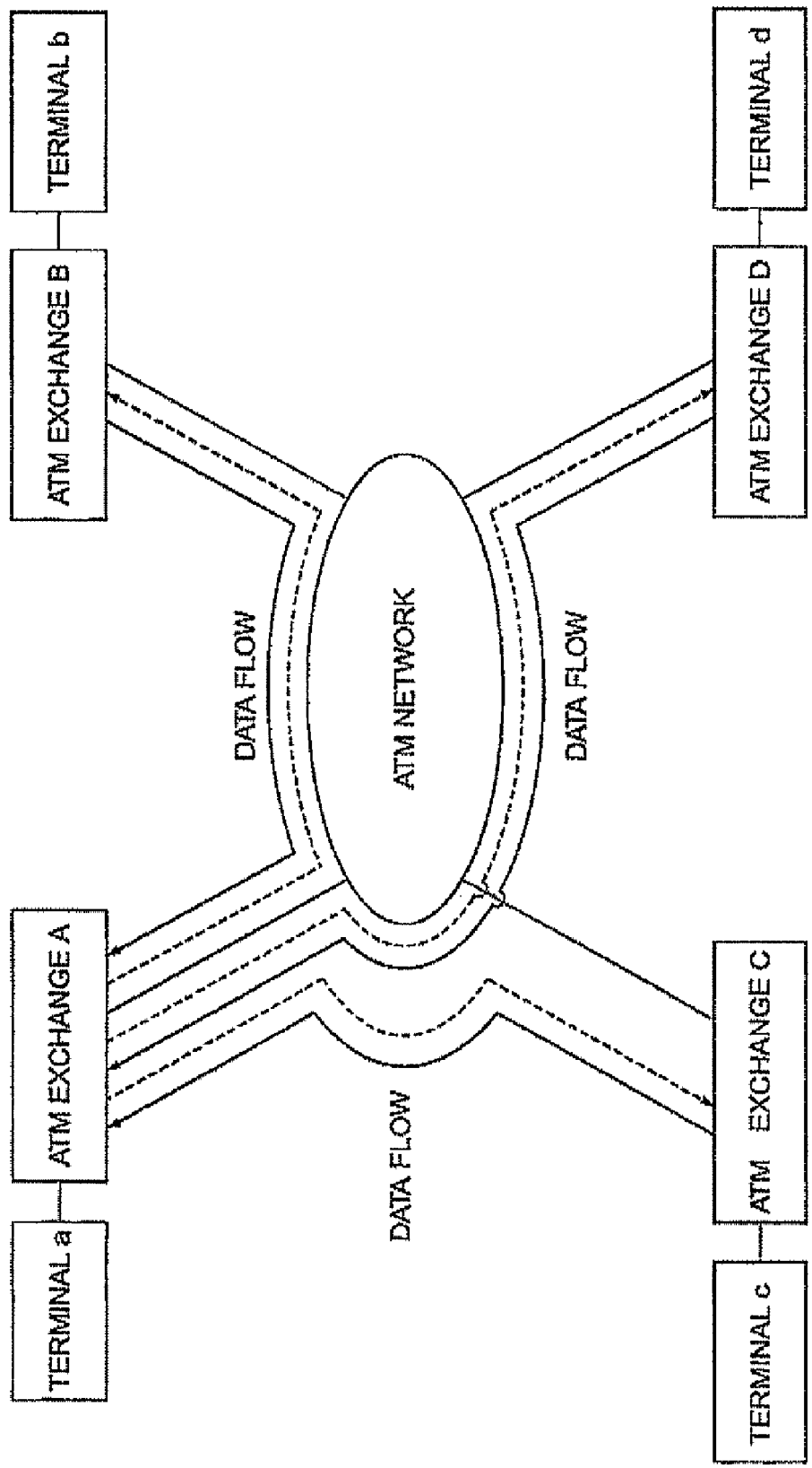
FIG. 2 is a diagram showing an ATM network to which four ATM exchanges are connected.
Figure 3A:
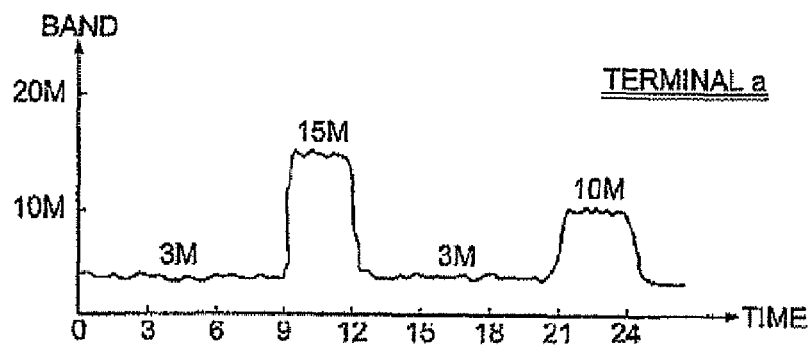
FIGS. 3A through 3D are diagrams showing temporal states upon using traffic bands of terminals a, b, c and d.
Figure 3B:
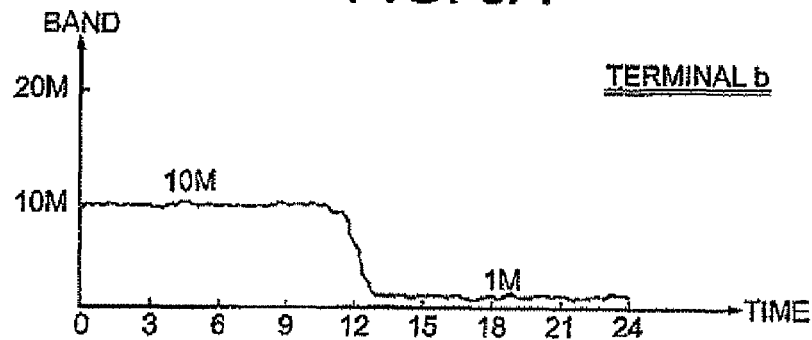
Figure 3C:
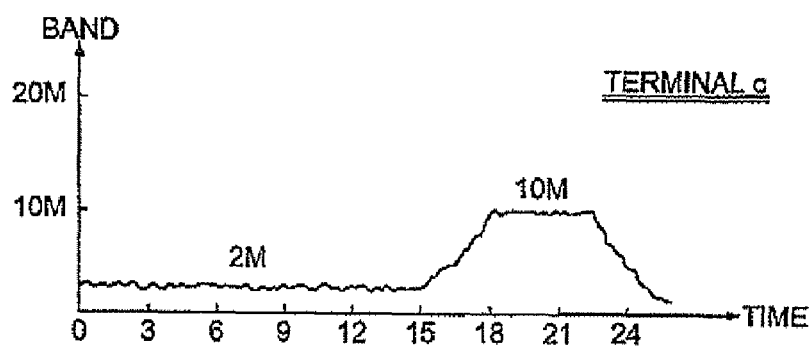
Figure 3D:
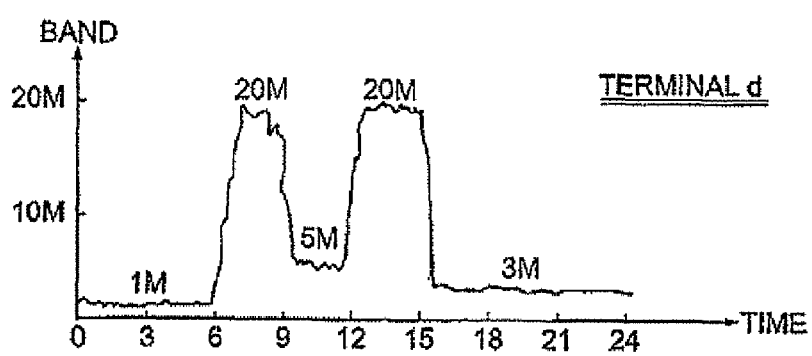

Referring to FIG. 2, four ATM exchanges A, B, C and D are connected to one ATM network. In this example, the ATM exchange A manages the four ATM exchanges as a main ATM exchange. The other ATM exchanges B, C and D report traffic bands that have been used by respective terminals connected thereto in time sequence to the ATM exchange A.

The ATM exchange A totalizes the statistic of its own traffic and the statistics of the traffic bands of the other ATM exchanges B, C and D and determines traffic bands that can be used by each of the ATM exchanges in time sequence. The result of the determination is reported to the other ATM exchanges B, C and D. Thus, traffic bands are allocated so that the terminals connected to the four ATM exchanges can use temporally.

Subsequently, description will be made about an operation of the above-mentioned example. Referring to FIG. 2, terminals a, b, c and d are connected to the ATM exchanges A, B, C and D, respectively, and an example of temporal use of traffic bands by the terminals a through d is shown in FIGS. 3A to 3D.

For example, statistics of average usage of traffic bands at the terminal a in a few days have revealed that traffic bands of 3 Mbps, 15 Mbps, 3 Mbps and 10 Mbps are used in time zones of 0:00 to 9:00, 9:00 to 12:00, 12:00 to 21:00 and 21:00 to 24:00, respectively. Similarly, statistics of the usage of traffic bands at the terminals b, c and d in a few days are obtained, as illustrated in FIG. 3.

Referring back to FIG. 2, when the ATM exchange B obtains statistics of traffic bands used by the terminal b in the few days, it reports the information to the ATM exchange A using an ATM cell. Similarly, the ATM exchanges C and D also report statistical information upon traffic bands used by the terminals connected thereto for the ATM exchange A.

The ATM exchange A allocates traffic bands usable for the respective terminals a, b, c, and d in time sequence on the basis of statistics of traffic bands of the terminal a connected to itself and the statistical information on the traffic bands of the terminals b, c and d.

Figure 4:
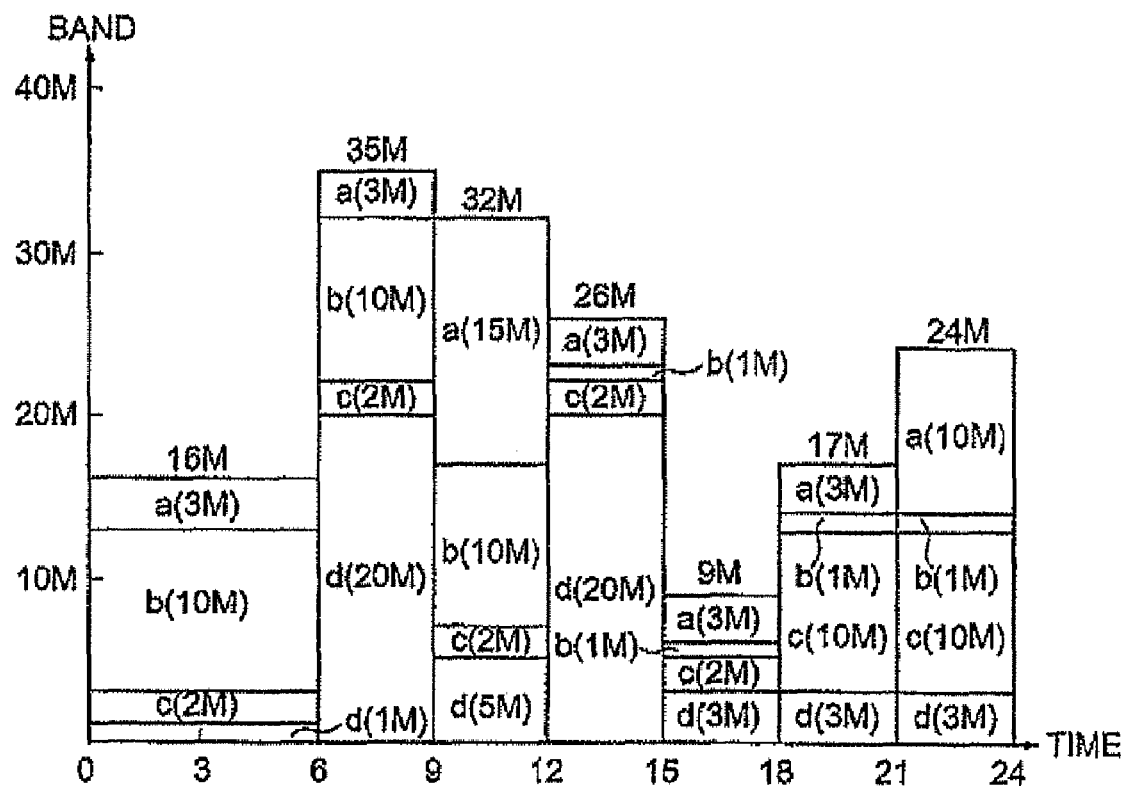
FIG. 4 is a diagram showing allocation of traffic bands usable by the terminals a, b, c and d.

As allocated in FIG. 4, the ATM exchange A reports the result to the ATM exchanges B, C and D. The ATM exchanges B, C and D can recognize traffic bands usable in time sequence from the report so that they control traffic bands under such conditions. For example, the terminal d can use the 20 Mbps band from 6:00 to 9:00. Therefore, the ATM exchange D performs communication within the above-mentioned band.

If traffic bands usable in time sequence are reported to the terminals a through d connected to the respective ATM exchanges, each of the terminals can recognize traffic bands which can be used by own itself in time sequence. By displaying such information to the terminal user, the user can recognize time zones at which the user most frequently can use as well as time zones at which the user cannot use.

Figure 5:
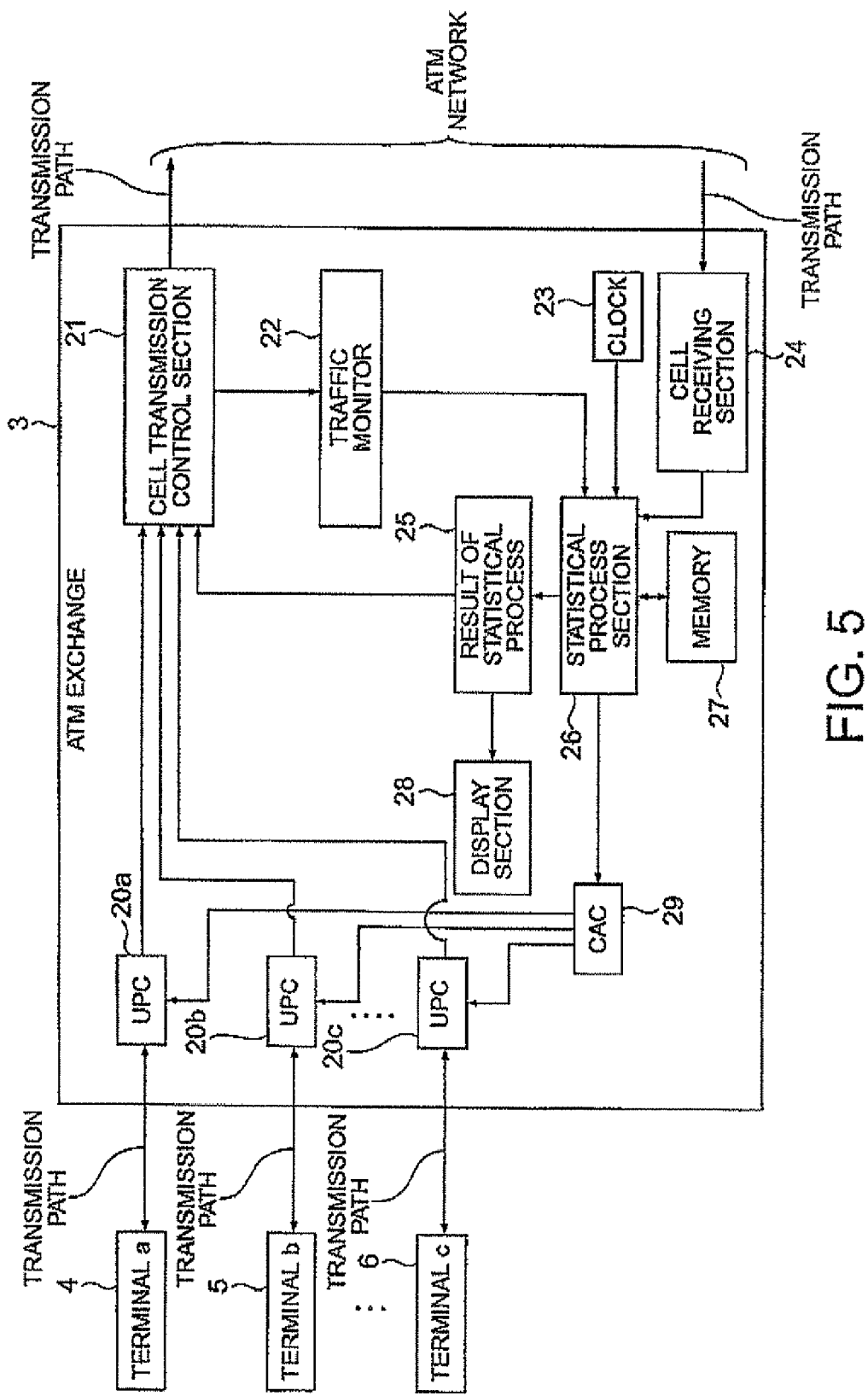
FIG. 5 is a diagram showing an example of a configuration in which a plurality of terminals are connected to a single ATM exchange according to a second embodiment of this invention.

Referring to FIG. 5, description will be made about a second embodiment of this invention. In the second embodiment, a plurality of terminals are connected to a single ATM exchange and control of traffic bands are carried out by each of the terminals connected to the ATM exchange. As illustrated in FIG. 5, three terminals a, b and c are connected to a single ATM exchange.

An ATM exchange 3 includes UPCs 20a, 20b and 20c associated with terminals a(4), b(5) and c(6), respectively, and a traffic monitor 22 monitors cell transmission bands of the respective terminals a, b and c via a cell transmission control section 21. The result of monitoring is subjected to a temporal statistical process at a statistical process section 26 so as to be to a CAC 29. The CAC 29 issues instructions to the UPCs 20a, 20b and 20c upon traffic bands to be controlled for the respective terminals a, b and c.

Figure 6A:
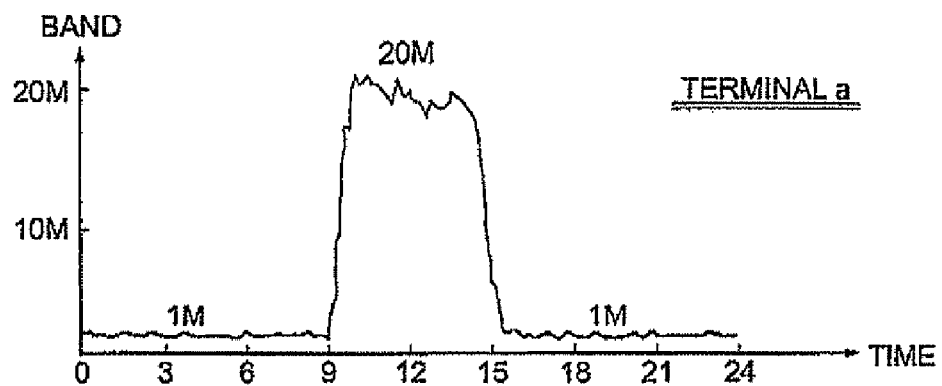
FIGS. 6A through 6C are diagrams showing temporal states upon using traffic bands of terminals a, b, and c.
Figure 6B:
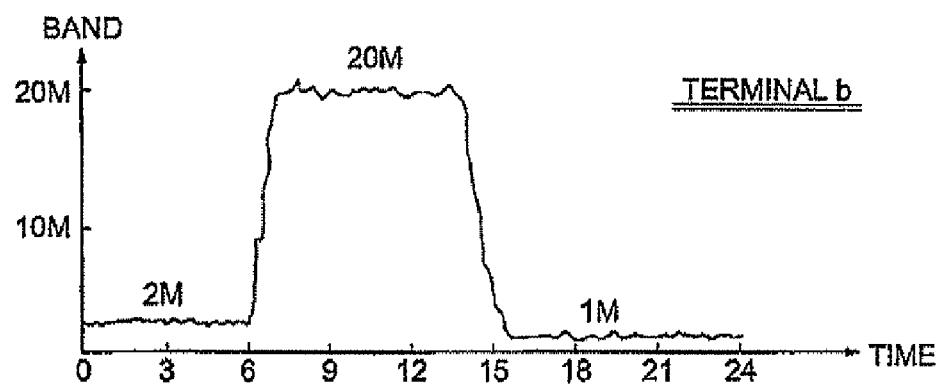
Figure 6C:
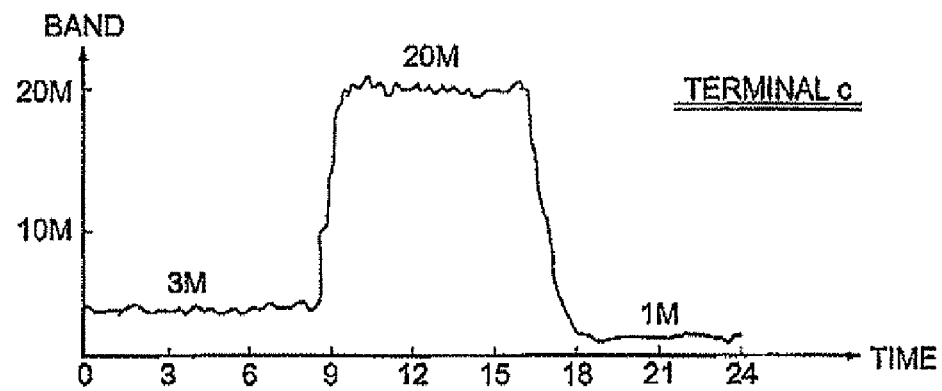

For example, let us assume that states of traffic bands used by the terminals a, b and c are as shown in FIGS. 6A to 6C. Then, if the maximum traffic band capable of controlling by the ATM exchange 3 is equal to 50 Mbps, the total of the traffic bands which can be used by the terminals a, b, and c, becomes 60 Mbps in the time zone from 9:00 to 15:00, and exceeds the maximum traffic band.

Figure 7:
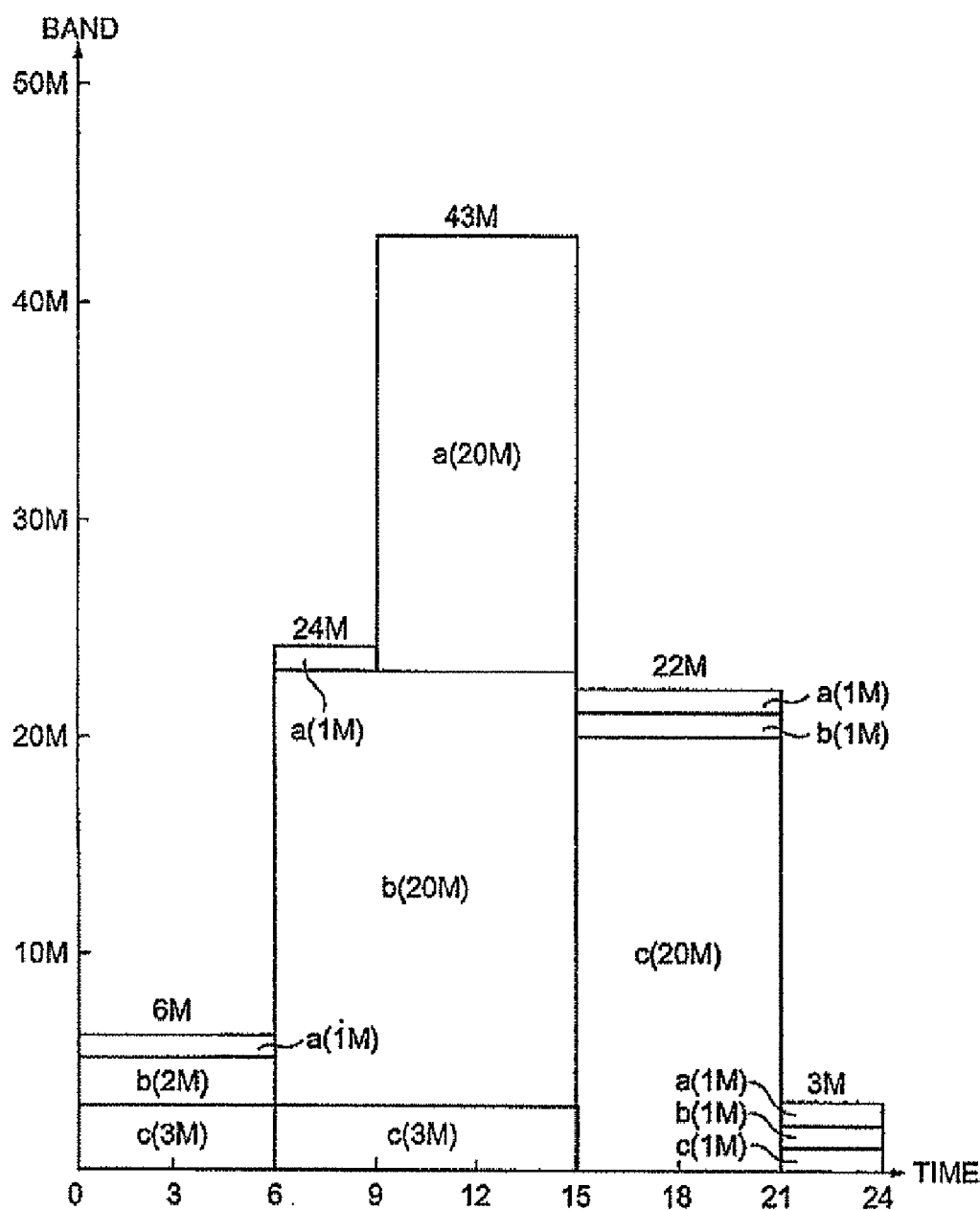
FIG. 7 is a diagram showing allocation of traffic bands usable by the terminals a, b and c.

Based on the result of a statistical process at the statistical process section 26, the CAC 29 therefore controls so that the traffic of the terminal c is shifted beyond 15:00. As a result, the traffic bands are subjected to load distribution as shown in FIG. 7, and the terminals a, b and c use transmission paths in accordance with the load distribution.

While this invention has thus far been disclosed in conjunction with several embodiments thereof, it will be readily possible for those skilled in the art to put this invention into practice in various other manners.

The invention claimed is:

1. A method comprising:
   determining average bandwidth usages over a network corresponding to a number of time of day segments and associated with a plurality of subscriber devices;
   allocating, to at least one of the subscriber devices, a first maximum amount of bandwidth for use in a first time of day segment based on the determined average bandwidth usage corresponding to the first time of day segment associated with the at least one subscriber device; and
   allocating, to at least one other of the subscriber devices, a second maximum amount of bandwidth for use in the first time of day segment based on the determined average bandwidth usage corresponding to a second time of day segment associated with the at least one other subscriber device.

2. The method of claim 1, wherein the second maximum amount of bandwidth is less than a third maximum amount of bandwidth that is based on the determined average bandwidth usage corresponding to the first time of day segment associated with the at least one other subscriber device.

3. The method of claim 1, wherein the first time of day segment and the second time of day segment comprise consecutive time of day segments.

4. The method of claim 1, wherein the plurality of subscriber devices have associated subscribed maximum amounts of bandwidth, the determined average bandwidth usages not exceeding the associated subscribed maximum amounts of bandwidth for respective subscriber devices.

5. The method of claim 1, wherein the plurality of subscriber devices have associated subscribed maximum amounts of bandwidth, the first maximum amount of bandwidth not exceeding the associated subscribed maximum amount of bandwidth for the at least one subscriber device.

6. The method of claim 1, wherein the plurality of subscriber devices have associated subscribed maximum amounts of bandwidth, the allocating the first maximum amount of bandwidth being further based on the associated subscribed maximum amount of bandwidth for the at least one subscriber device.

7. The method of claim 1, wherein the determining the average bandwidth usages associated with each of the plurality of subscriber devices is performed at network devices associated with each of the plurality of subscriber devices.

8. The method of claim 1, wherein the determining the average bandwidth usages associated with each of the plurality of subscriber devices is performed at a single network device associated with the plurality of subscriber devices.

9. The method of claim 1, wherein the allocating the first maximum amount of bandwidth is performed at a first network device associated with the at least one subscriber device, and the allocating the second maximum amount of bandwidth is performed at a second network device associated with the at least one other subscriber device.

10. The method of claim 1, wherein the allocating the first maximum amount of bandwidth and the allocating the second maximum amount of bandwidth is performed at a single network device associated with the at least one subscriber device and the at least one other subscriber device.

11. The method of claim 1, wherein the first maximum amount of bandwidth equals the determined average bandwidth usage corresponding to the first time of day segment associated with the at least one subscriber device.

12. A network device comprising:
   a processing section to determine bandwidth usage statistics associated with transmissions over a network connection to a first one of a plurality of subscriber devices and corresponding to a number of time of day segments; and
   a control section configured to:
      apply, when a sum of bandwidth usage statistics associated with the plurality of subscriber devices and corresponding to a first time of day segment is below a threshold amount, a first maximum amount of bandwidth allocation to the network connection during the first time of day segment, wherein the first maximum amount of bandwidth allocation is based on the determined bandwidth usage statistics associated with the first subscriber device and corresponding to the first time of day segment, and
      apply, when the sum of bandwidth usage statistics associated with the plurality of subscriber devices and corresponding to the first time of day segment exceeds the threshold amount, a second maximum amount of bandwidth allocation to the network connection during the first time of day segment, wherein the second maximum amount of bandwidth allocation is based on the determined bandwidth usage statistics associated with the first subscriber device and corresponding to a second time of day segment.

13. The network device of claim 12, wherein the second maximum amount of bandwidth allocation is less than the first maximum amount of bandwidth allocation.

14. The network device of claim 12, wherein the processing section is configured to report the determined bandwidth usage statistics associated with the first subscriber device and corresponding to the first time of day segment to another network device, the network device further comprising:
   a connection admission controller to receive information from the other network device indicating an allocation of one of the first maximum amount of bandwidth allocation or the second allocated maximum amount of bandwidth allocation, and inform the control section of the allocation.

15. The network device of claim 12, further comprising:
   a connection admission controller to:
      allocate one of the first allocated maximum amount of bandwidth allocation or the second allocated maximum amount of bandwidth allocation based on the determined bandwidth usage statistics associated with the first subscriber device and corresponding to the first time of day segment, and
      instruct the control section which of the first allocated maximum amount of bandwidth allocation or the second allocated maximum amount of bandwidth allocation to apply to the network connection.

16. The network device of claim 15, wherein the connection admission controller is configured to receive the bandwidth usage statistics associated with the plurality of subscriber devices and corresponding to the first time of day segment, and determine the sum of bandwidth usage statistics associated with the plurality of subscriber devices.

17. The network device of claim 12, wherein the first time of day segment and the second time of day segment comprise consecutive time of day segments.

18. The network device of claim 12, further comprising:
a connection admission controller to receive bandwidth usage statistics associated with transmissions over another network connection to a second one of the plurality of subscriber devices and corresponding to the first time of day segment; and
send an instruction to another network device to apply, when a sum of bandwidth usage statistics associated with the plurality of subscriber devices and corresponding to a first time of day segment exceeds the threshold amount, a third maximum amount of bandwidth allocation to the other network connection during the first time of day segment, wherein the third maximum amount of bandwidth allocation is based on the determined bandwidth usage statistics associated with the second subscriber device and corresponding to the first time of day segment.

19. A system comprising:
means for acquiring statistical information relating to transmissions over a network associated with a plurality of subscriber devices and corresponding to at least a first time of day segment and a second time of day segment;
means for allocating, to a first one of the subscriber devices, a first maximum amount of bandwidth for use in the network during the first time of day segment based on the statistical information associated with the first subscriber device and corresponding to the first time of day segment; and
means for allocating, to a second one of the subscriber devices, a second maximum amount of bandwidth for use in the network during the first time of day segment based on the statistical information associated with the second subscriber device and corresponding to the second time of day segment.

20. The system of claim 19, wherein the statistical information indicates that less bandwidth is used for the transmissions, associated with the first and second subscriber devices, over the network corresponding to the second time of day segment versus bandwidth used for the transmissions, associated with the first and second subscriber devices, over the network corresponding to the second time of day segment.

* * * * *